United States Patent [19]
Griffiths et al.

[11] 3,712,026
[45] Jan. 23, 1973

[54] ENTHALPY EXCHANGE SYSTEM

[76] Inventors: William C. Griffiths, 70 John F. Kennedy Blvd., Somerset; Emery A. Danko, 30 Clearview Drive, East Brunswick, both of N.J.

[22] Filed: Nov. 4, 1970

[21] Appl. No.: 86,788

[52] U.S. Cl.................................55/32, 165/107
[51] Int. Cl.......................B01d 53/14, F24d 15/00
[58] Field of Search.............55/32, 34, 171–177, 55/390, 208; 165/187; 261/151

[56] References Cited

UNITED STATES PATENTS 2,792,071   5/1957   Pennington ....................55/390
2,798,570   7/1957   Kelly ..............................55/32
3,064,952   11/1962  Brown ............................55/32

FOREIGN PATENTS OR APPLICATIONS 1,278,153   10/1961   France ........................165/107

*Primary Examiner*—Charles N. Hart
*Attorney*—Alfred L. Patmore, Jr. and Irvin Groh

[57] ABSTRACT

An enthalpy exchange system utilizing a hygroscopic solution to transfer latent and sensible heat between an incoming fresh air stream and an air stream being exhausted to effect partial conditioning of air and/or an overall economy of operation in a universal air conditioning system.

13 Claims, 3 Drawing Figures

INVENTORS.
WILLIAM C. GRIFFITHS
EMERY A. DANKO
ATTORNEY

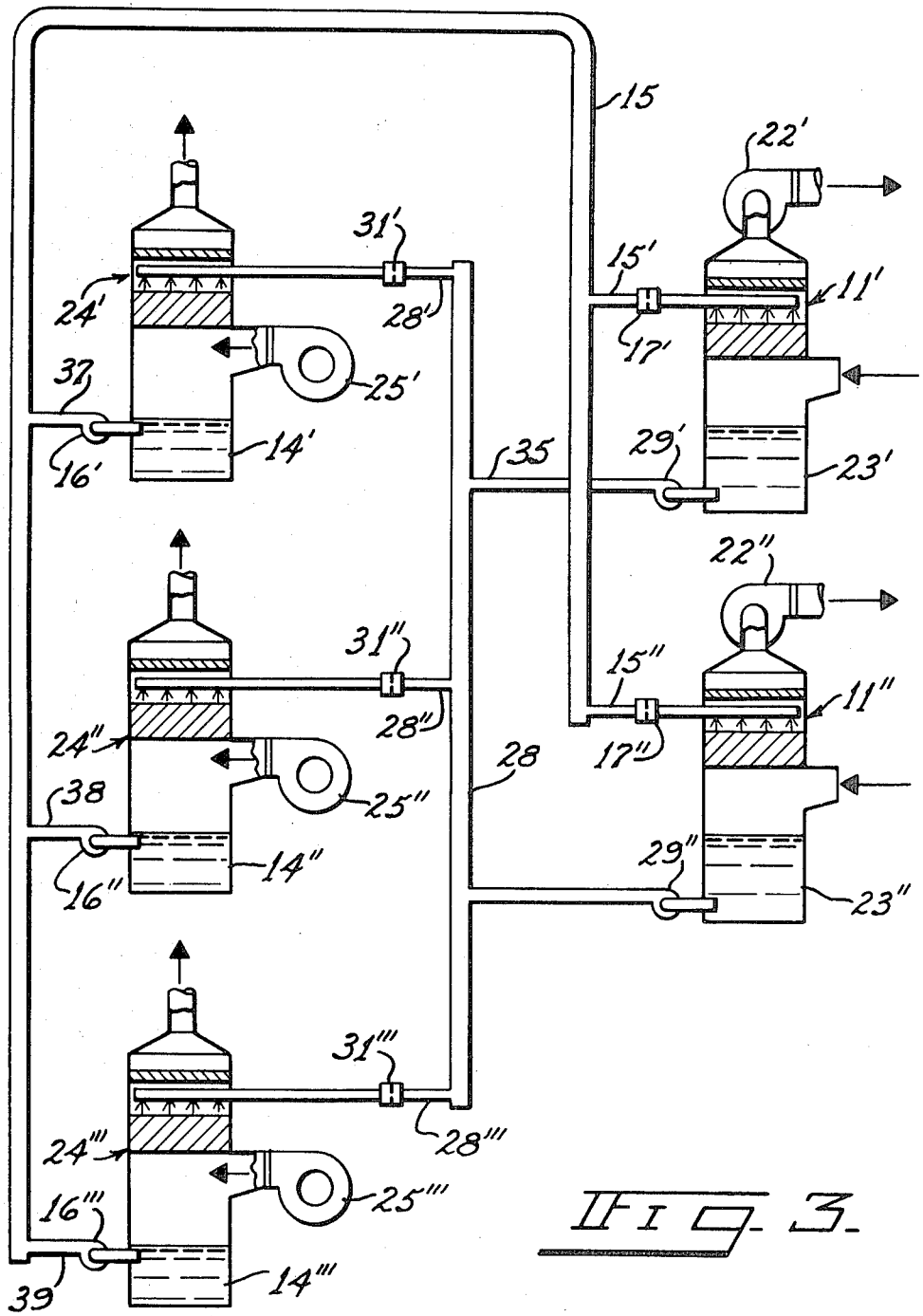

ENTHALPY EXCHANGE SYSTEM

BACKGROUND OF THE INVENTION

Field of the Invention

An air-to-air heat recovery system which has particular utility, for example, in large comfort air conditioning systems or in the treatment of process air for various industrial operations is presented. This system utilizes a hygroscopic solution as a medium for transferring heat between two or more air streams, and, because the solution is hygroscopic, not only sensible heat but latent heat is transferred. Specifically, the present system can be utilized for both winter and summer operation, and in its simplest form an intake air tower and an exhaust air tower is provided wherein hygroscopic solution is recirculated in a continuous circuit. Two sumps are employed, and hygroscopic solution is delivered from the second of these sumps through the intake air tower to the first of these sumps; outside air is delivered to this intake tower and flows therethrough in counterflow contact with the hygroscopic solution passing therethrough; this air is finally passed to a point of use such as a space to be conditioned. Hygroscopic solution is delivered from the first sump through an exhaust air tower and then into the second sump. Air is delivered from the point of utilization such as the space being conditioned through the exhaust air tower in direct counterflow contact with the hygroscopic solution passing therethrough. Thus, sensible and latent heat are transferred between the solution and the intake air in the intake air tower, and sensible and latent heat are transferred between the hygroscopic solution and the exhaust air in the exhaust air tower.

As hereinafter more fully set forth, it can be seen that in many instances it may be advantageous to use a plurality of intake towers with one exhaust air tower or to utilize a plurality of exhaust air towers with one intake tower or, in some instances, to utilize a plurality of both exhaust and intake air towers. The primary advantage in these arrangements is that hygroscopic solution may be easily pumped to the various intake and/or exhaust towers as opposed to the more difficult and expensive installation of ductwork to central locations.

Description of the Prior Art

There are a variety of air-to-air heat recovery devices currently being marketed. These generally take the form of a rotary regenerative heat exchanger which utilizes a cylinder or disc packed with a coarsely knitted metal mesh or a desiccant impregnated material. As the cylinder is rotated, adjacent streams of exhaust air and incoming air pass through different sectors of the wheel to thereby exchange heat with the packing material of the wheel. If a metallic mesh is used, only sensible heat is transferred. If a desiccant impregnated material is utilized, both latent and sensible heat are transferred so as to make the system a total heat or enthalpy exchanger. The design of this type of equipment is discussed in detail in the 1969 *ASHRAE Guide and Data Book*, pages 447–453. Various examples of transferor wheels utilized in such prior art devices are shown in U.S. Pat. Nos. 3,423,268 to H. E. Rahm and D. L. Brimmer, 3,065,956 to G. W. Meek and 3,155,153 to A. B. Axelsson. One inherent problem involved with the use of these prior art solid packing sensible heat or enthalpy exchange wheels is that it is difficult to provide an air seal between the rotating wheel and the casing and also between adjacent air stream ductwork so as to eliminate overall system leakage and cross-contamination between the intake and exhaust air streams. This same sealing difficulty makes differences in static pressure between the intake and exhaust air streams difficult to handle. The inherent air containing volume of the transferor wheel itself carries a certain amount of air past the air seals dividing the intake and exhaust air streams so as to cause a cross-contamination of the order of 4 percent. The actual amount can be easily calculated from the volume of the wheel, its speed of rotation and its air handling capacity. This carry-over cross-contamination can be reduced to less than 1 percent by utilizing a purge air sector, but this reduces the overall system efficiency and adds expense. In order to obtain an efficient overall enthalpy exchange between air streams, it is necessary to either tightly pack the transfer material or to utilize fine fluted passages in an impregnated medium so that frequent maintenance is required in cleaning the wheel to prevent excessive pressure drops.

SUMMARY OF THE INVENTION

The enthalpy exchange system of the present invention utilizes at least two sumps which contain hygroscopic solution. There is a constant interchange of solution between these sumps so that the net flow of hygroscopic solution between intake air towers and exhaust air towers is essentially equal. In the case of the simple two sump-two tower system, a solution is pumped from the second one of these sumps to a spray bar distributor adjacent the top of the intake air tower from which it passes through a contact surface such as a plastic impregnated cellulose material and then to the first of these solution sumps. This first sump may be an integral part of the air intake tower. Outside air to be treated is passed into this intake tower adjacent its bottom area to pass in counterflow relationship with the hygroscopic solution flowing through the packing. Hygroscopic solution is withdrawn from the first sump and pumped to a spray distributor at the top of the exhaust air tower for passage downwardly through a contact packing therein. The hygroscopic solution then passes into the second sump which may be an integral part of the exhaust air tower. Thus, an exchange of both latent and sensible heat is accomplished between the outside intake air and the air being exhausted from the environment being conditioned. A significant advantage may be realized in this hygroscopic solution enthalpy exchange system when multiple exhaust and/or intake towers are used. For example, a typical hospital installation may utilize a central intake tower to initially treat outside air which is passed by ductwork to various rooms where the final conditioning may be accomplished just prior to introducing the air into the individual room. Individual exhaust air towers then can be used adjacent to each of these rooms so that the exhaust air ducting can be a relatively short span. The hygroscopic solution from these various exhaust air towers can then be pumped back to the single intake air tower. This solution piping is obviously less expensive than the ductwork necessary to return exhaust air to a central tower.

BRIEF DESCRIPTION OF THE DRAWINGS

FIG. 3 is a schematic representation of a different embodiment of a multiple air tower system similar to the system of FIG. 2.

DESCRIPTION OF THE PREFERRED EMBODIMENT

Two-Tower System

Figure 1:
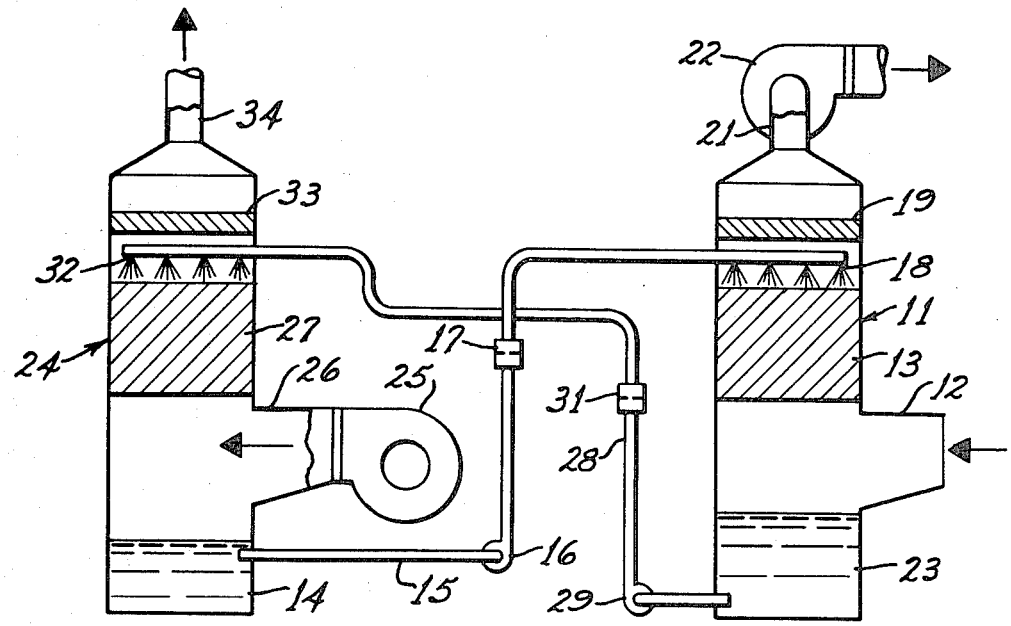
FIG. 1 is a schematic representation of an enthalpy exchange system utilizing a single intake air tower and a single exhaust air tower.

In accordance with the invention illustrated in FIG. 1, outside air is admitted to intake tower 11 through inlet 12 and passes upwardly through packing or extended contact surface 13 in counterflow contact with hygroscopic solution being pumped from sump or reservoir 14 via line 15, pump 16, flow control orifice 17 and spray nozzles 18. The thus treated outside air passes through spray eliminator 19 and is delivered by fan 22 to its point of use with or without additional air conditioning between tower 11 and the point of use depending upon the delivered air condition desired. The hygroscopic solution, after flowing through packing 13, passes into sump 23. Exhaust air from the space being conditioned is introduced into exhaust tower 24 by fan 25 through inlet 26 and passes upwardly through packing 27 in counterflow contact with hygroscopic solution which is pumped from sump 23 via line 28, pump 29, orifice 31 and spray nozzles 32. The thus treated air then passes through eliminator 33 to exhaust passage 34. The hygroscopic solution, after flowing through packing 27, passes into sump 14. The packings or extended surfaces 13 and 27 are advantageously made of a corrugated material impregnated with a thermosetting resin in order to supply a maximum of contact surface and be impervious to the corrosive nature of the hygroscopic liquid being utilized in the system. An example of such a packing material is marketed under the trademark CELdeck by Munters Corporation, Fort Myers, Fla. Eliminators 19 and 33 are similarly made of a plastic mesh material to withstand corrosion and function to eliminate any carry-over of entrained droplets of hygroscopic solution in the air exiting from the intake and exhaust air towers. A typically good hygroscopic solution is an aqueous salt solution of lithium chloride, calcium chloride, zinc chloride, lithium bromide or a mixture of these halogen salts or certain organic hygroscopic solutions such as the glycols. These materials all possess very favorable vapor pressure characteristics so as to obtain a maximum amount of latent heat transfer, as is well known in the art.

Sumps 14 and 23 must be sized so as to be able to accommodate variations in equilibrium concentrations which occur from summer to winter operations. It is also apparent that in order to maintain equilibrium conditions within the two contact towers, an equal weight of hygroscopic solution must be transferred from one sump to the other. This may be accomplished in a number of ways, and as shown in FIG. 1, orifices 17 and 31 are so sized to accomplish this flow equalization. Further line 15 is so located adjacent the top of sump 14 so that if flow from sump 14 through intake tower 11 to sump 23 is too rapid, the level in sump 14 drops to a point where pump 16 will merely pump air to maintain equilibrium conditions. An alternate method of flow equalization could use a suitable level controller and an automatic valve in conjunction with either the intake tower 11 or the exhaust air tower 24. Sumps 14 and 23 are shown in FIG. 1 to be an integral part of contact towers 24 and 11, respectively. This presents an easy method of construction, but obviously the sumps can be located separate and apart from the respective contact towers, as shown, for example, in the multiple tower system of FIG. 2. Obviously, the fans or blowers can be located at either the inlet or exit of the towers without affecting the enthalpy exchange efficiency of the system. However, in FIG. 1 it should be noted that fan 22 associated with intake air tower 11 is located at the exhaust end of the tower, and fan 25 associated with exhaust air tower 24 is located at the intake end of the tower. This subjects these fans to the smallest change in air density from winter to summer operation, thus providing a minimum change in the static pressure balance of the overall air handling system.

OVERALL MODE OF OPERATION

Generally speaking, outside air entering the intake air tower during summer operation is cooled and dehumidified, and the hygroscopic solution passing therethrough is diluted and heated. In the winter, outside air passing through the intake air tower is heated and humidified, and the hygroscopic solution passing therethrough is concentrated and cooled therein. Exhaust air entering the exhaust air tower during summer is heated and humidified, and the hygroscopic solution passing through is cooled and concentrated therein. Likewise, exhaust air entering the exhaust air tower during the wintertime is cooled and dehumidified, and the hygroscopic solution passing therethrough is heated and diluted therein.

SUMMER OPERATION

A typically sized tower can have a capacity of 8,000 to 10,000 scfm (standard cubic feed per minute). A typical outside air design condition is 95° F. (dry bulb temperature) and 120 gr./lb. (grains of moisture per pound of dry air). For comfort conditioning a typical assumed design condition can be 75° F. and 65 gr./lb. Under these design conditions an intake air tower having an air handling capacity of 10,000 cfm and a hygroscopic solution capacity of 46,000 lbs./hr. of lithium chloride salt would produce an outlet air condition of 85.9° F. and 93.2 gr./lb. This would typically be further cooled and dehumidified in an air conditioning system intermediate the intake air tower and the space to be conditioned to 55° F. and 60 gr./lb. The air exhausted from the space being conditioned would enter the exhaust air tower at the design space conditions of 75° F. and 65 gr./lb. With an exhaust air tower capacity of 8,000 cfm, the air would be exhausted to the outside at 88° F. and 98.5 gr./lb. With the above assumed design conditions and the typical performance of the towers, the heat load reduction would be 263,300 Btu./hr.

WINTER OPERATION

With the same 10,000 cfm capacity intake air tower and the 8,000 cfm capacity air exhaust tower utilizing interchange of 46,000 lbs./hr. of salt, the heat load saving during winter operation can similarly be calculated. With an assumed outside air entering temperature of 0° F. and 3 gr./lb. of moisture, the air exiting from the intake air tower would have a temperature of 34.3° F. and 21.8 gr./lb. of moisture. This air would be typically further heated and humidified to 85° F. and 55 gr./lb. in intermediate conditioning equipment for introduction into the space to be conditioned. Assuming that the air being exhausted from the conditioned space is at winter design conditions of 75° F. and 45 gr./lb., the air then being exhausted to the outside would have a temperature of 33.8° F. and 21.5 gr./lb. The overall heat saving of this system would be 486,000 Btu./hr.

MULTIPLE TOWER SYSTEM — COMMON SUMPS

Figure 2:
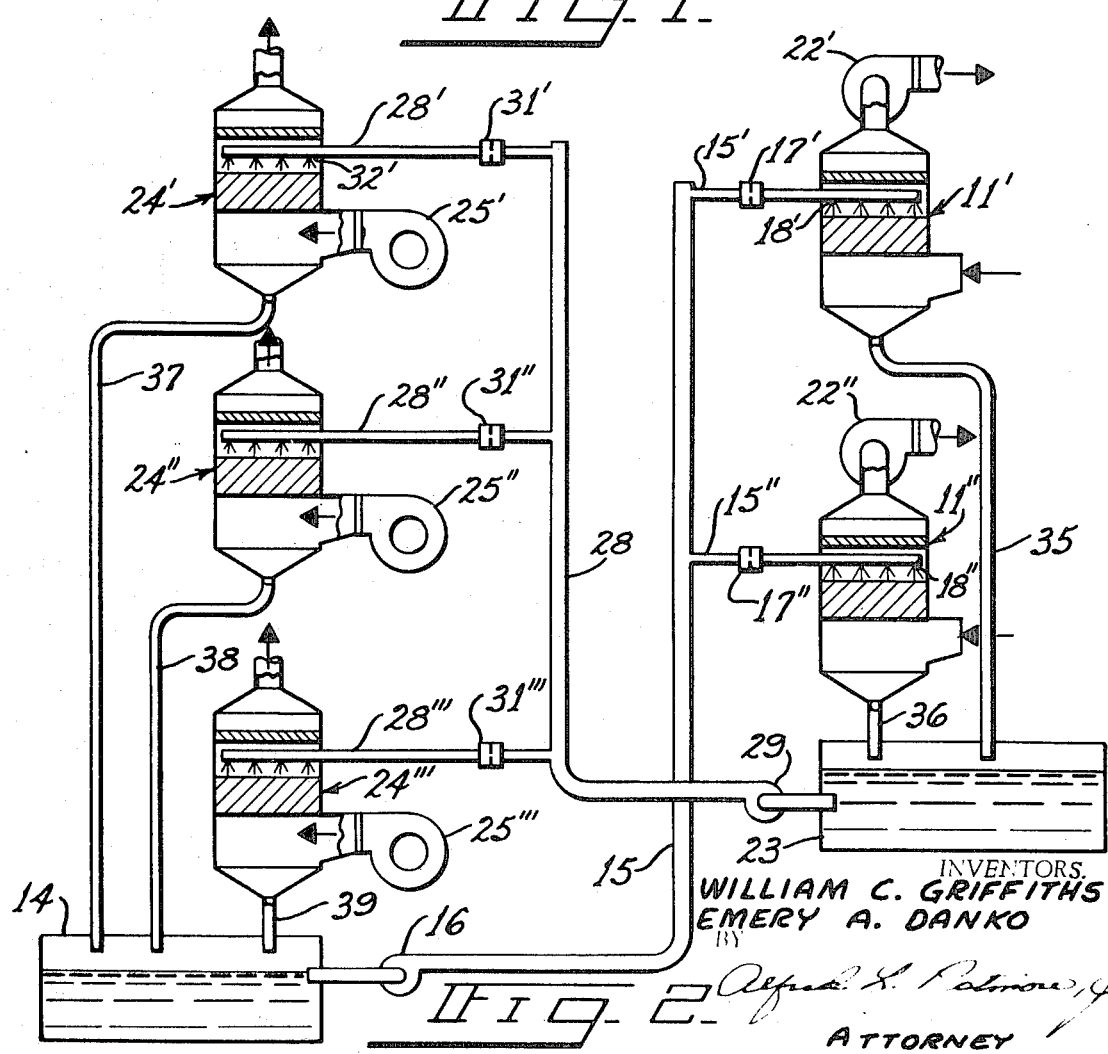
FIG. 2 is a schematic representation of an enthalpy exchange system utilizing multiple air intake and multiple exhaust air towers.

FIG. 2 illustrates the invention as applied to the use of multiple intake air towers and multiple exhaust air towers. The same numbering of elements used in FIG. 1 has been applied to the corresponding elements in FIG. 2 except that when more than one identical unit is used in FIG. 2, this number has been given a prime superscript. While FIG. 2 shows two intake air towers 11' and 11" and three exhaust air towers 24', 24", 24"', it will be readily understood that any number of intake air towers and exhaust air towers may be used in a single combination to achieve a particular result. The most common application of this type of system would, in fact, utilize either one intake air tower in combination with a plurality of exhaust air towers or one exhaust air tower in combination with a plurality of intake air towers. The operation of the individual intake air towers 11' and 11" and the operation of the individual exhaust air towers 24', 24" and 24"' shown in FIG. 2 is the same as that shown in FIG. 1 and will not reiterated. The hygroscopic solution exiting from intake air towers 11' and 11" pass via lines 35 and 36 respectively to a common sump 23. Likewise, the hygroscopic solution exiting from exhaust air towers 24', 24" and 24"' pass via lines 37, 38 and 39 respectively to a common sump 14. Hygroscopic solution is pumped from sump 14 via pump 16, line 15, line 15', orifice 17' and spray nozzles 18' into intake air tower 11', and hygroscopic solution is pumped from sump 14 via pump 16, line 15, line 15", orifice 17" and spray nozzles 18" into intake air tower 11". Hygroscopic solution is pumped from sump 23 via pump 29, line 28, line 28', orifice 31' and spray nozzles 32' into exhaust air tower 24'. In a like manner, hygroscopic solution is pumped from sump 23 into exhaust air towers 24" and 24"' through branch lines 28" and 28"'. While the solution lines exiting from all of the towers are shown to provide gravity flow to the two sumps, it will be apparent to one skilled in the art that suitable auxiliary pumps may be utilized when a gravity flow arrangement cannot be utilized on one or more of the lines, or a pressurized feed system may be used with individual tower sumps as more clearly set forth in FIG. 3.

MULTIPLE TOWER SYSTEM — SEPARATE SUMPS

FIG. 3 illustrates the invention as applied to multiple intake air towers and multiple exhaust air towers, each tower having its own associated sump which is shown integral with the tower. The same element numbering system utilized in FIG. 2 is employed in FIG. 3. With the individual intake air towers 11' and 11" each having its own integral sump 23' and 23" respectively, individual pumps 29' and 29" are utilized to pump hygroscopic solution via branch lines or pipes 35 and 36 to line 28 which, as in FIG. 2, serves as a distribution header for supplying hygroscopic solution to exhaust air towers 24', 24" and 24"'. Similarly, exhaust towers 24', 24" and 24"' each having its own integral sump 14', 14" and 14"' respectively, individual pumps 16', 16" and 16"' are utilized to pump hygroscopic solution via branch lines or pipes 37, 38 and 39 to line 15 which, as in FIG. 2, serves as a distribution header for supplying hygroscopic solution to intake air towers 11' and 11".

With this system, the location of the individual towers is more flexible, not depending on gravity feed to a common sump.

What is claimed is:

1. An enthalpy exchange system utilizing a hygroscopic solution to transfer latent and sensible heat from one air stream to another, comprising in combination: first and second sump means and a space to be conditioned; at least one intake air tower for contacting intake air and solution; at least one exhaust air tower for contacting exhaust air and solution; means for delivering hygroscopic solution from said second sump means through said intake air tower to said first sump means; means for delivering hygroscopic solution from said first sump means through said exhaust air tower to said second sump means; means connected to said space for delivering intake air through said intake air tower in direct counterflow contact with solution passing therethrough to a space to be conditioned, and means connected to said space for delivering air from said space to be conditioned through said exhaust air tower in direct counterflow contact with solution passing therethrough to an external exhaust, whereby sensible and latent heat are transferred between said solution and intake air in said intake air tower and sensible and latent heat are transferred between said solution and exhaust air in said exhaust air tower.

2. Apparatus according to claim 1 wherein said first and second sump means comprise separate reservoirs which are constructed integral with each said intake air tower and each said exhaust air tower.

3. Apparatus according to claim 1 wherein a single intake air tower is utilized for contacting outside intake air and hygroscopic solution, and said first sump means is a single reservoir from which hygroscopic solution is delivered to at least one exhaust air tower and to which reservoir hygroscopic solution is delivered from said single intake air tower.

4. Apparatus according to claim 3 wherein a single exhaust air tower is utilized for contacting air delivered from the space being conditioned and hygroscopic solution, and said second sump means is a single reservoir from which hygroscopic solution is delivered to said single intake air tower and to which reservoir hygroscopic solution is delivered from said single exhaust air tower.

5. Apparatus according to claim 4 wherein said first sump means is a reservoir which is constructed integral with said intake air tower, and said second sump means is a single reservoir constructed integral with said exhaust air tower.

6. Apparatus according to claim 3 wherein a plurality of exhaust air towers is used for contacting exhaust air and hygroscopic solution.

7. Apparatus according to claim 6 wherein said second sump means comprises a single reservoir to which hygroscopic solution is delivered from each of said exhaust air towers and from which reservoir hygroscopic solution is delivered to said single intake air tower.

8. Apparatus according to claim 1 wherein a single exhaust air tower is utilized for contacting air delivered from said space being conditioned and hygroscopic solution, and said second sump means is a single reservoir from which hygroscopic solution is delivered to at least one intake air tower and to which reservoir hygroscopic solution is delivered from said single exhaust air tower.

9. Apparatus according to claim 8 wherein a plurality of intake air towers is used for contacting intake air and hygroscopic solution.

10. Apparatus according to claim 9 wherein said first sump means comprises a single reservoir to which hygroscopic solution is delivered from each of said intake air towers and from which reservoir hygroscopic solution is delivered to said single exhaust air tower.

11. Apparatus according to claim 1 wherein a plurality of intake air towers is utilized for contacting outside intake air and hygroscopic solution, and a plurality of exhaust air towers is utilized for contacting air delivered from said space being conditioned and hygroscopic solution.

12. Apparatus according to claim 11 wherein said first sump means comprises a single reservoir from which hygroscopic solution is delivered to said plurality of exhaust air towers and to which reservoir hygroscopic solution is delivered from said plurality of intake air towers, and said second sump means comprises a single reservoir from which hygroscopic solution is delivered to said plurality of intake air towers and to which reservoir hygroscopic solution is delivered from said plurality of exhaust air towers.

13. In a method of transferring latent and sensible heat from one air stream to another by contacting both streams with hygroscopic solutions, the steps comprising: maintaining separate first and second bodies of hygroscopic solution; circulating solution from the second body through a first packing to the first body; circulating solution from the first body through a second packing to the second body; passing a first stream of outside air through said first packing in counterflow relationship to the solution passing therethrough, and then passing said first stream to a conditioned space; and passing a second stream of air from said conditioned space through said second packing in counterflow relationship to the solution passing therethrough, and then exhausting said second stream to the outside.

* * * * *